(12) United States Patent
Erb et al.

(10) Patent No.: US 12,170,376 B1
(45) Date of Patent: Dec. 17, 2024

(54) BATTERY CONFIGURATIONS FOR CELL BALANCING

(71) Applicant: Apple Inc., Cupertino, CA (US)

(72) Inventors: Dylan Erb, San Jose, CA (US); Abraham B. Caulk, Livermore, CA (US); Ross L. Johnstal, Sunnyvale, CA (US); Paul W. Firehammer, West Olive, MI (US); Edward T. Hillstrom, Vancouver (CA); Christopher T. Campbell, San Jose, CA (US); Andrew C. Chu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 18/108,551

(22) Filed: Feb. 10, 2023

Related U.S. Application Data (62) Division of application No. 17/014,550, filed on Sep. 8, 2020, now Pat. No. 11,588,155.

(51) Int. Cl.
*H01M 4/66* (2006.01)
*H01M 4/38* (2006.01)
(Continued)

(52) U.S. Cl.
CPC ............. *H01M 4/661* (2013.01); *H01M 4/38* (2013.01); *H01M 10/0525* (2013.01);
(Continued)

(58) Field of Classification Search
CPC .................................................. H01M 4/661
See application file for complete search history.

(56) References Cited

U.S. PATENT DOCUMENTS

| 4,317,864 A | 3/1982 | Strasser |
| 4,374,186 A | 2/1983 | McCartney et al. |
| (Continued) | | |

FOREIGN PATENT DOCUMENTS

| CN | 1620735 A | 5/2005 |
| CN | 101202355 A | 6/2008 |
| (Continued) | | |

OTHER PUBLICATIONS

U.S. Appl. No. 15/742,009, Advisory Action, Mailed on Oct. 28, 2020, 4 pages.
(Continued)

*Primary Examiner* — Brian R Ohara
(74) *Attorney, Agent, or Firm* — Kilpatrick Townsend & Stockton LLP (57) ABSTRACT

Energy storage devices, battery cells, and batteries of the present technology may include a first battery cell. The first battery cell may include an anode current collector, and an anode active material disposed on the anode current collector. The first battery cell may include a cathode current collector and a cathode active material disposed on the cathode current collector. The current collectors may be polymeric materials. The batteries may include a first conductive band electrically coupled with the first battery cell. The first conductive band may be seated on the second surface of one of the anode current collector or the cathode current collector. The first conductive band may extend about a perimeter of the one of the anode current collector or the cathode current collector. The batteries may include a cell module including a first flexible extension electrically coupled with the first conductive band.

20 Claims, 4 Drawing Sheets

(51) Int. Cl.
  *H01M 10/04* (2006.01)
  *H01M 10/0525* (2010.01)
  *H01M 10/0585* (2010.01)
  *H01M 10/42* (2006.01)
  *H01M 50/463* (2021.01)

(52) U.S. Cl.
  CPC ....... *H01M 10/425* (2013.01); *H01M 50/463* (2021.01); *H01M 10/0413* (2013.01); *H01M 10/0436* (2013.01); *H01M 10/0585* (2013.01); *H01M 2010/4271* (2013.01)

(56) References Cited

U.S. PATENT DOCUMENTS

| | | |
|---|---|---|
| 4,567,119 A | 1/1986 | Lim |
| 5,162,169 A | 11/1992 | Tomantschger et al. |
| 5,162,172 A | 11/1992 | Kaun |
| 5,254,415 A | 10/1993 | Williams et al. |
| 5,367,431 A | 11/1994 | Kunishi et al. |
| 6,004,698 A | 12/1999 | Richardson et al. |
| 8,124,266 B2 | 2/2012 | Yamazaki |
| 8,153,410 B2 | 4/2012 | Jaffe |
| 8,357,469 B2 | 1/2013 | Shaffer, II et al. |
| 8,663,833 B2 | 3/2014 | Hosaka et al. |
| 9,142,811 B2 | 9/2015 | Chami |
| 10,916,741 B1 | 2/2021 | Dafoe et al. |
| 10,916,796 B1 | 2/2021 | Zeilinger et al. |
| 10,923,728 B1 | 2/2021 | Zeng |
| 11,018,343 B1 | 5/2021 | Dafoe et al. |
| 11,043,703 B1 | 6/2021 | Zeng et al. |
| 11,189,834 B1 | 11/2021 | Zeng |
| 11,228,074 B2 | 1/2022 | Kaye et al. |
| 11,296,351 B1 | 4/2022 | Gorer et al. |
| 11,296,361 B2 | 4/2022 | Chu et al. |
| 11,335,977 B1 | 5/2022 | Zeng et al. |
| 11,532,824 B2 | 12/2022 | Chu et al. |
| 11,588,155 B1 | 2/2023 | Erb et al. |
| 11,600,891 B1 | 3/2023 | Erb et al. |
| 11,677,120 B2 | 6/2023 | Erb et al. |
| 11,699,815 B1 | 7/2023 | Zeng et al. |
| 11,791,470 B2 | 10/2023 | Campbell et al. |
| 11,862,801 B1 | 1/2024 | Zeng |
| 11,888,112 B2 | 1/2024 | Kaye et al. |
| 11,923,494 B2 | 3/2024 | Erb et al. |
| 2001/0038939 A1 | 11/2001 | Bailey |
| 2002/0146620 A1 | 10/2002 | Connell |
| 2003/0027051 A1 | 2/2003 | Kejha et al. |
| 2003/0096170 A1 | 5/2003 | Fujiwara et al. |
| 2003/0194605 A1* | 10/2003 | Fauteux .............. H01M 50/534 429/149 |
| 2004/0001302 A1 | 1/2004 | Sato et al. |
| 2005/0019643 A1 | 1/2005 | Sugita et al. |
| 2005/0106456 A1 | 5/2005 | Puester et al. |
| 2007/0210760 A1 | 9/2007 | Shimamura et al. |
| 2008/0187824 A1 | 8/2008 | Tomantschger |
| 2009/0023059 A1 | 1/2009 | Kinoshita et al. |
| 2009/0068531 A1 | 3/2009 | Sawa et al. |
| 2009/0087728 A1 | 4/2009 | Less et al. |
| 2009/0117456 A1 | 5/2009 | Hosaka et al. |
| 2009/0136832 A1 | 5/2009 | Mitsuda et al. |
| 2009/0233175 A1 | 9/2009 | Kelley et al. |
| 2009/0297892 A1 | 12/2009 | Ijaz et al. |
| 2010/0124693 A1 | 5/2010 | Kosugi et al. |
| 2010/0134942 A1 | 6/2010 | Wang et al. |
| 2010/0285355 A1* | 11/2010 | Kozinsky .............. H01M 4/74 977/762 |
| 2011/0294007 A1 | 12/2011 | Hosaka et al. |
| 2012/0148913 A1 | 6/2012 | Chiba |
| 2012/0156552 A1 | 6/2012 | Miyazaki et al. |
| 2012/0189896 A1 | 7/2012 | Zhou et al. |
| 2012/0219835 A1 | 8/2012 | Kawabe et al. |
| 2012/0263995 A1 | 10/2012 | Naito et al. |
| 2013/0065106 A1 | 3/2013 | Faust |
| 2013/0089774 A1 | 4/2013 | Chami |
| 2013/0242593 A1 | 9/2013 | LoRocco et al. |
| 2013/0266823 A1 | 10/2013 | Lee |
| 2014/0127542 A1 | 5/2014 | Li et al. |
| 2014/0154542 A1 | 6/2014 | Issaev et al. |
| 2014/0178753 A1 | 6/2014 | Chu et al. |
| 2015/0037616 A1 | 2/2015 | Wyatt et al. |
| 2015/0155564 A1 | 6/2015 | Chami et al. |
| 2015/0200393 A1 | 7/2015 | Li et al. |
| 2015/0228937 A1 | 8/2015 | Spilker |
| 2015/0311490 A1 | 10/2015 | Murase et al. |
| 2015/0325894 A1 | 11/2015 | Merriman et al. |
| 2016/0049646 A1 | 2/2016 | Fujiki et al. |
| 2016/0049679 A1 | 2/2016 | Stevens et al. |
| 2016/0093845 A1 | 3/2016 | DeKeuster et al. |
| 2016/0099456 A1 | 4/2016 | Kwon et al. |
| 2016/0099490 A1 | 4/2016 | Larsson |
| 2016/0111729 A1 | 4/2016 | Kim et al. |
| 2016/0197352 A1 | 7/2016 | Blaser et al. |
| 2016/0248113 A1 | 8/2016 | He et al. |
| 2016/0329535 A1 | 11/2016 | Moomaw et al. |
| 2016/0329606 A1 | 11/2016 | Ro et al. |
| 2017/0012331 A1 | 1/2017 | Ng et al. |
| 2017/0077545 A1 | 3/2017 | Shaffer, II et al. |
| 2017/0133689 A1 | 5/2017 | Moore et al. |
| 2017/0214057 A1 | 7/2017 | Kotik et al. |
| 2018/0013144 A1 | 1/2018 | Li et al. |
| 2018/0219227 A1* | 8/2018 | Moomaw ................ H01M 4/82 |
| 2018/0226654 A1 | 8/2018 | Ohsawa et al. |
| 2018/0316063 A1 | 11/2018 | Masel et al. |
| 2019/0036147 A1 | 1/2019 | Yuan et al. |
| 2019/0237748 A1 | 8/2019 | Shin et al. |
| 2019/0283699 A1* | 9/2019 | Park ........................ B60R 22/46 |
| 2020/0028166 A1 | 1/2020 | Tanaka et al. |
| 2020/0052305 A1* | 2/2020 | Campbell ............. H01M 4/139 |
| 2020/0271371 A1* | 8/2020 | Oh ........................ F25D 17/062 |
| 2020/0395594 A1* | 12/2020 | Doi ..................... H01M 4/0459 |
| 2022/0111758 A1 | 4/2022 | Ijaz et al. |
| 2022/0111759 A1 | 4/2022 | Ijaz |
| 2022/0115897 A1 | 4/2022 | Ijaz |
| 2023/0026549 A1 | 1/2023 | Ijaz et al. |

FOREIGN PATENT DOCUMENTS

| | | |
|---|---|---|
| CN | 101809801 A | 8/2010 |
| CN | 101884125 A | 11/2010 |
| CN | 102005566 A | 4/2011 |
| CN | 102187504 A | 9/2011 |
| CN | 102272977 A | 12/2011 |
| CN | 102341948 A | 2/2012 |
| CN | 102576850 A | 7/2012 |
| CN | 103069614 A | 4/2013 |
| CN | 103165920 A | 6/2013 |
| CN | 103222098 A | 7/2013 |
| CN | 103548196 A | 1/2014 |
| CN | 103855360 A | 6/2014 |
| CN | 103904294 A | 7/2014 |
| CN | 104466191 A | 3/2015 |
| CN | 104604003 A | 5/2015 |
| CN | 107851747 A | 3/2018 |
| EP | 1125336 A1 | 8/2001 |
| EP | 1156547 A1 | 11/2001 |
| EP | 2892097 A1 | 7/2015 |
| EP | 3196955 A1 | 7/2017 |
| EP | 3317907 A | 5/2018 |
| EP | 3435473 A1 | 1/2019 |
| JP | 0562683 A | 3/1993 |
| JP | 06503442 A | 4/1994 |
| JP | 07161346 A | 6/1995 |
| JP | 2001357854 A | 12/2001 |
| JP | 2002343452 A | 11/2002 |
| JP | 2003096219 A | 4/2003 |
| JP | 3522303 B2 | 4/2004 |
| JP | 2005005163 A | 1/2005 |
| JP | 2006012556 A | 1/2006 |
| JP | 2007012584 A | 1/2007 |
| JP | 2009224097 A | 10/2009 |
| JP | 2011009203 A | 1/2011 |
| JP | 2011071011 A | 4/2011 |
| JP | 4857710 B2 | 1/2012 |

(56) References Cited

FOREIGN PATENT DOCUMENTS

| | | | |
|---|---|---|---|
| JP | 2012234823 A | 11/2012 | |
| JP | 2013114746 A | 6/2013 | |
| JP | 2013187074 A | 9/2013 | |
| JP | 5410822 B2 | 2/2014 | |
| JP | 2014029818 A | 2/2014 | |
| JP | 2018083957 A | 5/2018 | |
| JP | 2018519646 A | 7/2018 | |
| JP | 6636607 | 12/2019 | |
| KR | 20130066795 A | 6/2013 | |
| WO | 8504287 A1 | 9/1985 | |
| WO | 9210861 A1 | 6/1992 | |
| WO | 2010111087 A1 | 9/2010 | |
| WO | 2016031689 A1 | 3/2016 | |
| WO | 2017007827 A1 | 1/2017 | |
| WO | 2018057566 A1 | 3/2018 | |
| WO | WO-2018195372 A1 * | 10/2018 | ............ H01M 4/139 |
| WO | 2018213601 A2 | 11/2018 | |
| WO | 2019059133 A1 | 3/2019 | |
| WO | 2019184311 A1 | 10/2019 | |
| WO | 2021048028 A1 | 3/2021 | |

OTHER PUBLICATIONS

U.S. Appl. No. 15/742,009, Final Office Action, Mailed on Aug. 19, 2020, 13 pages.
U.S. Appl. No. 15/742,009, Non-Final Office Action, Mailed on Nov. 30, 2020, 13 pages.
U.S. Appl. No. 15/742,009, Non-Final Office Action, Mailed on Nov. 15, 2019, 14 pages.
U.S. Appl. No. 15/742,009, Non-Final Office Action, Mailed on Aug. 3, 2021, 16 pages.
U.S. Appl. No. 15/742,009, Notice of Allowance, Mailed on Dec. 24, 2021, 12 pages.
U.S. Appl. No. 15/742,009, "Restriction Requirement", Jun. 11, 2019, 8 pages.
U.S. Appl. No. 15/962,133, Advisory Action, Mailed on Nov. 18, 2020, 3 pages.
U.S. Appl. No. 15/962,133, Final Office Action, Mailed on Jul. 7, 2020, 5 pages.
U.S. Appl. No. 15/962,133, Non-Final Office Action, Mailed on Jan. 21, 2020, 10 pages.
U.S. Appl. No. 15/962,133, Notice of Allowance, Mailed on Feb. 9, 2021, 8 pages.
U.S. Appl. No. 16/007,534, Non-Final Office Action, Mailed on May 5, 2020, 11 pages.
U.S. Appl. No. 16/007,534, Notice of Allowance, Mailed on Nov. 18, 2020, 8 pages.
U.S. Appl. No. 16/038,865, Final Office Action, Mailed on Jun. 1, 2021, 7 pages.
U.S. Appl. No. 16/038,865, Non-Final Office Action, Mailed on Nov. 6, 2020, 13 pages.
U.S. Appl. No. 16/038,865, Notice of Allowance, Mailed on Aug. 13, 2021, 8 pages.
U.S. Appl. No. 16/049,250, Non-Final Office Action, Mailed on Apr. 8, 2020, 8 pages.
U.S. Appl. No. 16/049,250, Notice of Allowance, Mailed on Oct. 7, 2020, 7 pages.
U.S. Appl. No. 16/108,498, "Corrected Notice of Allowability", Mar. 9, 2022, 2 pages.
U.S. Appl. No. 16/108,498, Final Office Action, Mailed on Dec. 9, 2020, 25 pages.
U.S. Appl. No. 16/108,498, Non-Final Office Action, Mailed on May 17, 2021, 21 pages.
U.S. Appl. No. 16/108,498, Non-Final Office Action, Mailed on Apr. 30, 2020, 9 pages.
U.S. Appl. No. 16/108,498, Notice of Allowance, Mailed on Feb. 24, 2022, 11 pages.
U.S. Appl. No. 16/108,503, Final Office Action, Mailed on Oct. 12, 2022, 8 pages.
U.S. Appl. No. 16/108,503, Final Office Action, Mailed on May 25, 2021, 9 pages.
U.S. Appl. No. 16/108,503, Non-Final Office Action, Mailed on Oct. 2, 2020, 11 pages.
U.S. Appl. No. 16/108,503, Non-Final Office Action, Mailed on Feb. 2, 2022, 9 pages.
U.S. Appl. No. 16/108,522, Non-Final Office Action, Mailed on Sep. 9, 2020, 10 pages.
U.S. Appl. No. 16/108,522, Notice of Allowance, Mailed on Feb. 26, 2021, 8 pages.
U.S. Appl. No. 16/263,890, Non-Final Office Action, Mailed on Jun. 16, 2020, 9 pages.
U.S. Appl. No. 16/263,890, Notice of Allowance, Mailed on Oct. 23, 2020, 8 pages.
U.S. Appl. No. 16/273,625, "Corrected Notice of Allowability", Nov. 16, 2022, 2 pages.
U.S. Appl. No. 16/273,625, Final Office Action, Mailed on Feb. 16, 2021, 14 pages.
U.S. Appl. No. 16/273,625, Non-Final Office Action, Mailed on May 4, 2020, 14 pages.
U.S. Appl. No. 16/273,625, Non-Final Office Action, Mailed on Dec. 24, 2021, 16 pages.
U.S. Appl. No. 16/273,625, Notice of Allowance, Mailed on Sep. 1, 2022, 12 pages.
U.S. Appl. No. 16/522,475, Non-Final Office Action, Mailed on May 17, 2021, 17 pages.
U.S. Appl. No. 16/613,094, Final Office Action, Mailed on Jan. 23, 2023, 15 pages.
U.S. Appl. No. 16/613,094, Non Final Office Action, Mailed on Aug. 19, 2022, 16 Pages.
U.S. Appl. No. 16/658,442, Final Office Action, Mailed on Aug. 16, 2022, 15 pages.
U.S. Appl. No. 16/658,442, Non-Final Office Action, Mailed on Feb. 22, 2022, 16 pages.
U.S. Appl. No. 16/683,088, Final Office Action, Mailed on Oct. 12, 2021, 12 pages.
U.S. Appl. No. 16/683,088, Non-Final Office Action, Mailed on Sep. 2, 2021, 10 pages.
U.S. Appl. No. 16/683,088, Notice of Allowance, Mailed on Nov. 22, 2021, 8 pages.
U.S. Appl. No. 16/683,091, Non-Final Office Action, Mailed on Aug. 18, 2021, 22 pages.
U.S. Appl. No. 17/014,550, "Corrected Notice of Allowability", Nov. 14, 2022, 2 pages.
U.S. Appl. No. 17/014,550, Notice of Allowance, Mailed on Oct. 18, 2022, 10 pages.
U.S. Appl. No. 17/014,637, Final Office Action, Mailed on Dec. 1, 2022, 24 pages.
U.S. Appl. No. 17/014,637, Non-Final Office Action, Mailed on Feb. 24, 2022, 20 pages.
U.S. Appl. No. 17/014,637, Non-Final Office Action, Mailed on Jul. 25, 2022, 20 pages.
U.S. Appl. No. 17/014,717, Non-Final Office Action, Mailed on Oct. 13, 2022, 14 pages.
U.S. Appl. No. 17/014,717, Notice of Allowance, Mailed on Jan. 31, 2023, 7 pages.
U.S. Appl. No. 17/014,768, "Corrected Notice of Allowability", Nov. 14, 2022, 2 pages.
U.S. Appl. No. 17/014,768, Non-Final Office Action, Mailed on Jun. 30, 2022, 10 pages.
U.S. Appl. No. 17/014,768, Notice of Allowance, Mailed on Nov. 4, 2022, 7 pages.
U.S. Appl. No. 17/353,059, Non-Final Office Action, Mailed on Nov. 1, 2022, 8 pages.
Boeva et al., Soluble and Highly Ionically Conducting Interpolyelectrolyte Complexes Prepared via Chemical Template Polymerization of Aniline in the Presence of Perfluorinated Polysulfonic Acid, The Royal Society of Chemistry, vol. 4, No. 100, Oct. 31, 2014, pp. 56677-56681.
China Patent Application No. 201680039891.9, Notice of Decision to Grant, Mailed on Mar. 22, 2021, 2 pages.
China Patent Application No. 201680039891.9, Office Action, Mailed on Jun. 10, 2020, 18 pages.

(56) References Cited

OTHER PUBLICATIONS

China Patent Application No. 201680039891.9, Office Action, Mailed on Jan. 6, 2020, 23 pages.
China Patent Application No. 201680039891.9, Office Action, Mailed on Oct. 27, 2020, 8 pages.
China Patent Application No. 201780053071.X, Office Action, Mailed on Mar. 18, 2022, 15 pages.
China Patent Application No. 201780053071.X, Office Action, Mailed on Nov. 2, 2021, 20 pages.
China Patent Application No. 201780053071.X, Office Action, Mailed on Apr. 16, 2021, 21 pages.
China Patent Application No. 201780053071.X, Office Action, Mailed on Aug. 30, 2022, 29 pages.
China Patent Application No. 201880026199.1, Office Action, Mailed on Dec. 15, 2022, 13 pages.
China Patent Application No. 201880026199.1, Office Action, Mailed on Mar. 3, 2022, 8 pages.
China Patent Application No. 202011204662.2, Office Action, Mailed on Aug. 26, 2022, 14 pages.
China Patent Application No. 202011211648.5, Office Action, Mailed on Aug. 19, 2022, 12 pages.
European Patent Application No. 16738994.9, Notice of Decision to Grant, Mailed on Sep. 24, 2020, 2 pages.
European Patent Application No. 16738994.9, Office Action, Mailed on Mar. 23, 2018, 3 pages.
Japan Patent Application No. 2018-500449, Notice of Decision to Grant, Mailed on Nov. 18, 2019, 2 pages.
Japan Patent Application No. 2018-500449, Office Action, Mailed on Jan. 21, 2019, 11 pages.
Korea Patent Application No. 10-2018-7000263, Notice of Decision to Grant, Mailed on Apr. 8, 2020, 2 pages.
Korea Patent Application No. 10-2018-7000263, Office Action, Mailed on Sep. 27, 2019, 16 pages.
Korea Patent Application No. 10-2018-7000263, Office Action, Mailed on Feb. 28, 2019, 5 pages.
International Patent Application No. PCT/US2016/041151, International Preliminary Report on Patentability, Mailed on Jan. 18, 2018, 8 pages.
International Patent Application No. PCT/US2016/041151, International Search Report and Written Opinion, Mailed on Aug. 25, 2016, 10 pages.
International Patent Application No. PCT/US2017/052413, International Preliminary Report on Patentability, Mailed on Apr. 4, 2019, 12 pages.
International Patent Application No. PCT/US2017/052413, International Search Report and Written Opinion, Mailed on Feb. 1, 2018, 19 pages.
International Patent Application No. PCT/US2017/052413, "Invitation to Pay Additional Fees and, Where Applicable, Protest Fee", Dec. 8, 2017, 11 pages.
International Patent Application No. PCT/US2018/028472, International Preliminary Report on Patentability, Mailed on Oct. 31, 2019, 10 pages.
International Patent Application No. PCT/US2018/028472, International Search Report and Written Opinion, Mailed on Jul. 27, 2018, 13 pages.
International Patent Application No. PCT/US2018/033218, International Preliminary Report on Patentability, Mailed on Nov. 28, 2019, 9 pages.
International Patent Application No. PCT/US2018/033218, International Search Report and Written Opinion, Mailed on Nov. 16, 2018, 13 pages.
International Patent Application No. PCT/US2018/042598, International Search Report and Written Opinion, Mailed on Oct. 2, 2018, 14 pages.
International Patent Application No. PCT/US2020/060348, International Preliminary Report on Patentability, Mailed on May 27, 2022, 8 pages.
International Patent Application No. PCT/US2020/060348, International Search Report and Written Opinion, Mailed on Mar. 12, 2021, 9 pages.
International Patent Application No. PCT/US2020/060350, International Preliminary Report on Patentability, Mailed on May 27, 2022, 8 pages.
International Patent Application No. PCT/US2020/060350, International Search Report and Written Opinion, Mailed on Mar. 12, 2021, 12 pages.
International Patent Application No. PCT/US2021/049023, International Search Report and Written Opinion, Mailed on Dec. 22, 2021, 11 pages.
Thuc et al., Study on Synthesis and Characterization of Anion Exchange Membrane Based on Poly (Vinyl Alcohol) Modified by Free-Radical Polymerization, International Journal of Electrochemical Science, vol. 15, Jul. 10, 2020, pp. 8190-8199.
Weng et al., Three-Electrolyte Electrochemical Energy Storage Systems Using Both Anion- and Cation-Exchange Membranes as Separators, Energy, vol. 167, Jan. 15, 2019, pp. 1-32.
China Patent Application No. 201880026199.1, "Office Action", May 10, 2023, 20 pages.
Thaler, et al., "Automotive Battery Technology", Beijing Institute of Technology Press, Feb. 28, 2017, 5 pages.
International Patent Application No. PCT/US2021/049023, International Preliminary Report on Patentability, Mar. 23, 2023, 8 pages.
Machine Translation of JP 2001357854 A, Dec. 26, 2001, 18 pages.
U.S. Appl. No. 18/054,800, Non-Final Office Action, Jul. 5, 2024, 8 pages.
China Patent Application No. 201880026199.1, Office Action, Apr. 30, 2024, 22 pages.

\* cited by examiner

BATTERY CONFIGURATIONS FOR CELL BALANCING

CROSS-REFERENCE TO RELATED APPLICATION

This application is a divisional of, and claims the benefit of, U.S. patent application Ser. No. 17/014,550, filed Sep. 8, 2020, the entire disclosure of which is hereby incorporated by reference for all purposes.

TECHNICAL FIELD

The present technology relates to batteries and battery components. More specifically, the present technology relates to battery configurations to facilitate cell balancing of the incorporated battery cells.

BACKGROUND

In batteries and battery cells, balancing of one or more incorporated cells may be performed during operation. Balancing operations may be challenged by structural characteristics, and balancing may not be performed uniformly across a cell. Improved designs and processes are needed.

SUMMARY

The present technology relates to energy storage devices, including battery cells and batteries, which may include lithium-ion batteries having a variety of shapes including stacked cells, which may be or include bipolar batteries as well as batteries stacked in any orientation including vertical and horizontal, for example. These devices may include current collectors configured based on a z-direction transmission of current through the cell components, although current collectors configured based on an xy-directional transmission of current may also benefit from the present designs. The batteries and cells may include a host of features and material configurations as will be described throughout the disclosure.

Energy storage devices, battery cells, and batteries of the present technology may include a first battery cell. The first battery cell may include an anode current collector including a polymeric material, and the anode current collector may be characterized by a first surface and a second surface opposite the first surface. The first battery cell may include an anode active material disposed on the first surface of the anode current collector. The first battery cell may include a cathode current collector including a polymeric material, and the cathode current collector may be characterized by a first surface and a second surface opposite the first surface. The first battery cell may include a cathode active material disposed on the first surface of the cathode current collector. The batteries may include a first conductive band electrically coupled with the first battery cell. The first conductive band may be seated on the second surface of one of the anode current collector or the cathode current collector. The first conductive band may extend about a perimeter of the one of the anode current collector or the cathode current collector. The batteries may include a cell module including a first flexible extension electrically coupled with the first conductive band.

In some embodiments, the battery may include a second battery cell seated on the first battery cell. The second battery cell may include an anode current collector including a polymeric material. The anode current collector may be characterized by a first surface and a second surface opposite the first surface. The second battery cell may include an anode active material disposed on the first surface of the anode current collector. The second battery cell may include a cathode current collector including a polymeric material. The cathode current collector may be characterized by a first surface and a second surface opposite the first surface. The second battery cell may include a cathode active material disposed on the first surface of the cathode current collector. The second battery cell may include a second conductive band electrically coupled with the second battery cell. The second conductive band may be seated on the second surface of one of the anode current collector or the cathode current collector. The second conductive band may extend about a perimeter of the one of the anode current collector or the cathode current collector. The cell module may include a second flexible extension electrically coupled with the second conductive band.

The first conductive band may be coupled with the cathode current collector of the first battery cell by a conductive adhesive. The battery may include a flexible coupling material coupling the first conductive band with the anode current collector of the second battery cell. The flexible coupling material may include a metal material. The anode current collector and the cathode current collector may be characterized by an electrical resistivity of greater than or about $1\times10^{-4}$ ohm-m. The first conductive band may be maintained within a sealed region extending about a periphery of the first battery cell. The first flexible extension may include a conductive pad coupled with the first conductive band. The conductive pad may be electrically coupled with the cell module. The cell module may include a circuit board configured to perform voltage balancing by drawing current from the first battery cell at the first flexible extension.

Some embodiments of the present technology may encompass batteries, which may include a first conductive plate. The batteries may include a second conductive plate. The batteries may include a plurality of battery cells electrically coupled between the first conductive plate and the second conductive plate. Each battery cell of the plurality of battery cells may include an anode current collector including a polymeric material. The anode current collector may be characterized by a first surface and a second surface opposite the first surface. The battery cells may include an anode active material disposed on the first surface of the anode current collector. The battery cells may include a cathode current collector including a polymeric material. The cathode current collector may be characterized by a first surface and a second surface opposite the first surface. The battery cells may include a cathode active material disposed on the first surface of the cathode current collector. The batteries may include a conductive band seated on the second surface of one of the anode current collector or the cathode current collector. The conductive band may extend about a perimeter of the one of the anode current collector or the cathode current collector. The batteries may include a plurality of cell modules. Each cell module of the plurality of cell modules may include a flexible circuit board having a plurality of flexible extensions. Each flexible extension of the plurality of flexible extensions may be electrically coupled with a conductive band of a battery cell of the plurality of battery cells.

In some embodiments, the plurality of cell modules may extend in line with one another across a side of the battery. One or more flexible circuit boards may extend from a first location along a cell module of the plurality of cell modules.

One or more flexible circuit boards may extend from a second location along a cell module of the plurality of cell modules to electrically engage each corresponding battery cell of the plurality of battery cells from the inline cell modules. The conductive band of each battery cell of the plurality of battery cells may be coupled with the cathode current collector of the associated battery cell by a conductive adhesive. The batteries may include a flexible coupling material coupling the conductive band of a battery cell of the plurality of battery cells with the anode current collector of an overlying battery cell. The flexible coupling material may include a metal material. The anode current collector and the cathode current collector of each battery cell of the plurality of battery cells may be characterized by an electrical resistivity of greater than or about $1 \times 10^{-4}$ ohm-m. The conductive band of each battery cell of the plurality of battery cells may be maintained within a sealed region extending about a periphery of the battery cell. Each flexible extension of the plurality of flexible extensions may include a conductive pad coupled with an associated conductive band. The conductive pad may be electrically coupled with an associated cell module. Each cell module of the plurality of cell modules may include a circuit board configured to perform voltage balancing by drawing current from battery cells coupled with the cell module at the plurality of flexible extensions.

Some embodiments of the present technology may encompass methods of balancing a battery. The methods may include receiving a voltage measurement at a cell module coupled with a first battery cell of the battery. The first battery cell may include an anode current collector including a polymeric material, the anode current collector may be characterized by a first surface and a second surface opposite the first surface. The first battery cell may include an anode active material disposed on the first surface of the anode current collector. The first battery cell may include a cathode current collector comprising a polymeric material. The cathode current collector may be characterized by a first surface and a second surface opposite the first surface. The first battery cell may include a cathode active material disposed on the first surface of the cathode current collector. The battery may include a first conductive band electrically coupled with the first battery cell. The first conductive band may be seated on the second surface of one of the anode current collector or the cathode current collector. The first conductive band may extend about a perimeter of the one of the anode current collector or the cathode current collector. The methods may include drawing a current from the first battery cell of the battery to lower a state of charge of the first battery cell.

In some embodiments, the anode current collector and the cathode current collector of the first battery cell of the battery may be characterized by an electrical resistivity of greater than or about $1 \times 10^{-4}$ ohm-m. While drawing the current from the first battery cell, a voltage differential across the first battery cell may be maintained at less than or about 50 mV at a current draw of greater than or about 50 mA.

Such technology may provide numerous benefits over conventional technology. For example, the present devices may provide improved cell balancing for higher impedance current collectors. Additionally, batteries according to some embodiments of the present technology may control voltage differences through the battery cells while performing cell balancing. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes and are not to be considered of scale unless specifically stated to be of scale. Additionally, as schematics, the figures are provided to aid comprehension and may not include all aspects or information compared to realistic representations and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may be grouped in packs, where a battery may include multiple battery cells coupled together to provide a desired voltage or power. When batteries are connected in this way, they are often charged and discharged together. However, due to capacity differences between individual cells, without proper protection or control, individual cells may be overcharged or over-discharged. Many conventional technologies may incorporate a cell balancer that connects to the cell and can withdraw current from the cells, or transfer current between cells, to ensure the individual battery cells are maintained within tolerances.

Battery balancers may typically connect with a current collector, which may conventionally be a highly conductive metal. Accordingly, even connecting with a single location on the current collector allows current to be uniformly drawn from the battery cell. However, when current collectors are characterized by higher resistivity, connecting balancing components at a single location of a battery cell may damage the battery cell. For example, when a current collector is characterized by higher resistivity, current draw at the local connection location may proceed long before current begins drawing from more distal locations. This may cause voltage differences across the cell, which may impact performance. The present technology overcomes these issues by incorporating a conductive perimeter to a higher resistance current collector. By incorporating the conductive band, a single contact point may afford more uniform distribution of current effects about the perimeter, which may control discharge from the cell in a more uniform way.

Although the remaining portions of the description will routinely reference lithium-ion batteries, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed but can be utilized broadly with any number of devices that may exhibit some or all of the electrical or chemical characteristics of the discussed examples.

Figure 1:
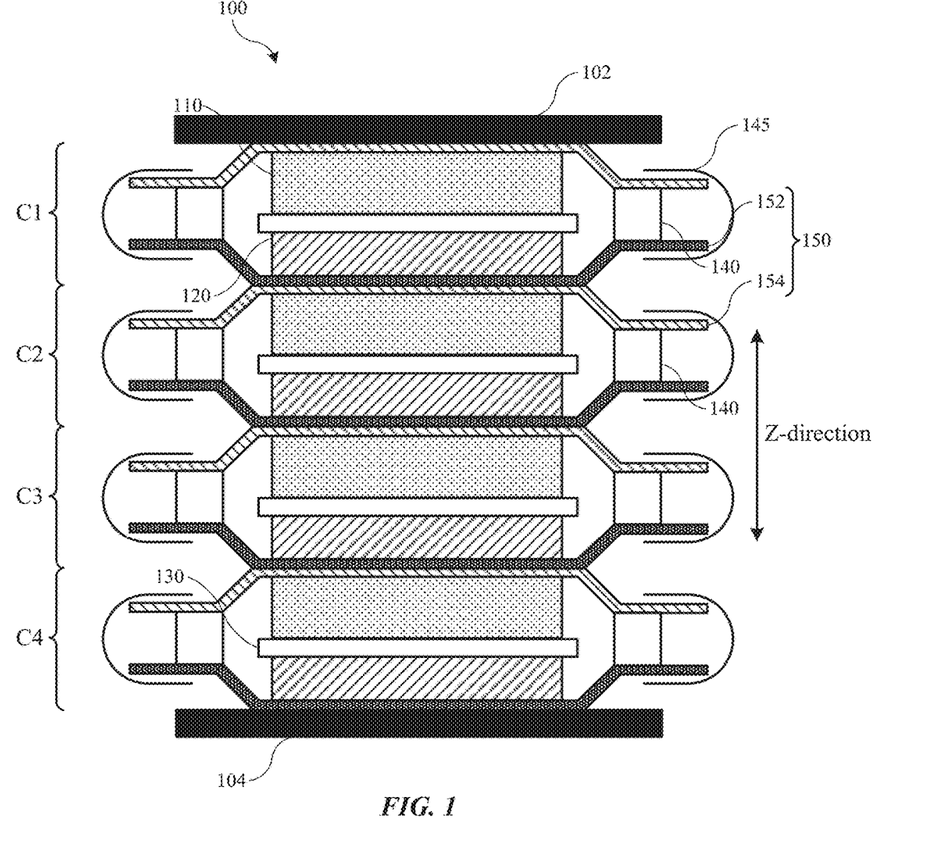
FIG. 1 shows a schematic cross-sectional view of an energy storage device according to some embodiments of the present technology.

FIG. 1 depicts a schematic cross-sectional view of an energy storage device according to embodiments of the present technology. The energy storage devices may include a single current collector or coupled current collectors. The energy storage devices may operate in a conventional manner with regard to electronic flow across or through material layers, such as providing electronic mobility across an xy-plane of the current collectors. Additionally, the described devices may operate by electronic flow through the structure in a z-direction through individual cells as opposed to via tabbed current collectors as described above for conventional batteries.

As illustrated, the stacked battery 100 may include a stack of electrochemical cells C1, C2, C3, and C4 between end plates 102 and 104. End plates 102 and 104 may be metal current collector plates, which can serve both electrical and mechanical functions. In some embodiments, end plates 102 and 104 can be support plates that form part of an external housing of the stacked battery. End plates 102 and 104 may also provide mechanical support within a housing of the stacked battery. Some or all of the support plates may be electrically conductive, and there may be a terminal within the support plate that is electrically connected to the end plate. In embodiments an additional plate similar to end plates 102 and 104 may be disposed within the stack of cells, such as between two cells. This configuration including an additional plate may provide structural rigidity, and the additional plate may also preform electronic functions similar to end plates 102, 104. End plates 102 and 104 may act as positive and negative terminals of the battery. The cells may pass current in the z-direction through individual cells to the end plates, which may transfer current in any direction across the plate and from the battery.

The stack of electrochemical or battery cells may include any number of electrochemical cells depending on the selected voltage for the stacked battery 100, along with the individual voltage of each individual electrochemical cell. The cell stack may be arranged with as many or as few electrochemical cells in series as desired, as well as with intervening plates for support and current transfer. For example, batteries according to some embodiments of the present technology may include greater than or about 5 battery cells, and may include greater than or about 10, greater than or about 20, greater than or about 50, greater than or about 100, greater than or about 200, greater than or about 500, or more individual cells in a battery. The cells C may be positioned adjacent, e.g., abutting, one another in some configurations. Each electrochemical cell C may include a cathode 110 and an anode 120, where the cathode 110 and anode 120 may be separated by separator 130 between the cathode and anode. Between the anode 120 of cell C1 and the cathode of adjacent cell C2 may be a stacked current collector 150. The stacked current collector 150 may form part of C1 and C2. On one side, stacked current collector 150 may be connected to the seal 140 of C1 and connected on an opposing side to the seal 140 of C2.

In some embodiments, as shown in FIG. 1, stacked current collector 150 may include a first current collector 152 and a second current collector 154. In embodiments one or both of the current collectors may include a metal or a non-metal material, such as a polymer or composite. As shown in the figure, in some embodiments the first current collector 152 and second current collector 154 can be different materials. In some embodiments, the first current collector 152 may be a material selected based on the potential of the anode 120, such as copper or any other suitable metal, as well as a non-metal material including a polymer. The second current collector may be a material selected based on the potential of the cathode 110, such as aluminum or other suitable metals, as well as a non-metal material including a polymer. In other words, the materials for the first and second current collectors can be selected based on electrochemical compatibility with the anode and cathode active materials used.

The first and second current collectors can be made of any material known in the art. For example, copper, aluminum, or stainless steel may be used, as well as composite materials having metallic aspects, and non-metallic materials including polymers. In some instances, the metals or non-metals used in the first and second current collector can be the same or different. The materials selected for the anode and cathode active materials can be any suitable battery materials. For example, the anode material can be silicon, graphite, carbon, a tin alloy, lithium metal, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors may have any suitable thickness and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 2:
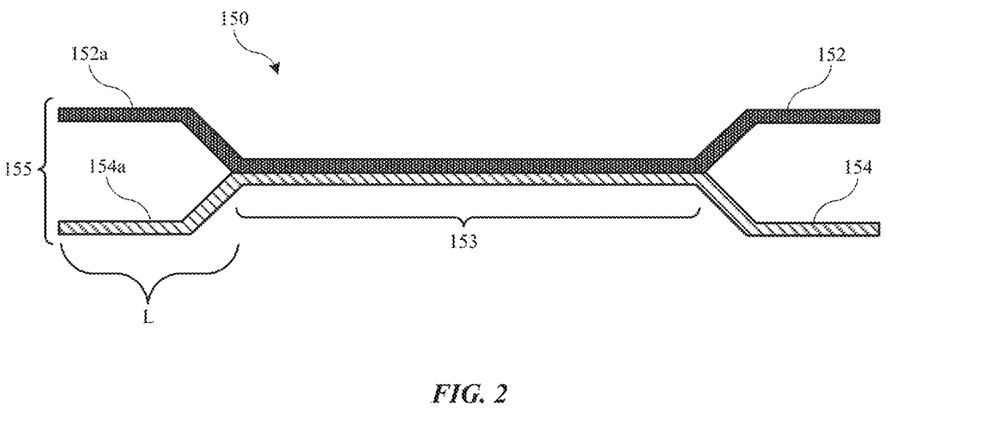
FIG. 2 shows a schematic cross-sectional view of a current collector according to some embodiments of the present technology.

Turning to FIG. 2, the stacked current collector 150 may have a connection region 153 where the first current collector 152 and second current collector 154 may be connected, and a gap region 155 at the peripheral ends of the collector 150. In the connection region 153, the first current collector and second current collector may be in direct contact or otherwise joined to be electrically conductive. In some embodiments, the first current collector and second current collector may be directly connected, while in other embodiments the first current collector and second current collector may be indirectly connected via a conductive material. To form the connection region 153, the first current collector 152 and the second current collector 154 may be laminated together. Additionally, the connection region 153 may be created by welding the first current collector 152 and the second current collector 154 together. The connection region 153 may also be created by using an adhesive, which may be electrically conductive, between the first current collector 152 and the second current collector 154. In other embodiments, the connection region 153 may be created by the wetting that can occur between the materials of the first current collector 152 and the second current collector 154.

In the gap region 155, the peripheral ends of the first current collector 152 and the second current collector 154 may be spaced apart and moveable relative to each other. As such, there may be a separation distance between the first and second current collectors, which may increase as the electrochemical cell swells. In some embodiments, the spaced apart peripheral ends of the first current collector 152 and the second current collector 154 may be of a length that is sufficient to accommodate an anticipated expansion of the individual electrochemical cells of the stacked battery during cycling of the battery. The peripheral ends of the current collectors 152$a$ and 154$a$ may have a length L, as shown in FIG. 2, which may be long enough that up to or at least about 10% expansion in the z-direction can be accommodated.

As shown in FIG. 1, each cell C1, C2, C3, and C4, also includes a seal 140, which, with the current collector layers, may electrochemically isolate the electrochemical cells from each other. Thus, each cathode-anode pair may be electrochemically sealed and isolated from neighboring electrochemical cells. Because the current collectors 152 and 154 may be separated at the peripheral ends, separate seals 140 can be formed on opposing sides, such as a top and bottom, of the stacked current collector 150. The seals 140 may be the same or different materials, and each seal 140 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first metal layer and/or second metal layer before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 110, the anode 120, and the separator 130 may be preassembled. A first current collector 152 may then be connected to the anode while a second current collector 154 may be connected to the cathode to create a cell. The seal material may be disposed between the first current collector 152 and the second current collector 154 to form seals 140. Finally, the peripheral ends of the sealed electrochemical cell may be further taped to frame the cell. Tapes 145, as well as other coatings, sealing, or material layers, may be disposed around the outer perimeter of the metal layers and seals. The tape 145 may be substituted with ceramic or polymeric materials. Tape 145 may be included for various reasons including to prevent shorting to adjacent layers or to surrounding conductive surfaces within the device, to provide improved electrochemical or chemical stability, and to provide mechanical strength.

FIGS. 1 and 2 illustrate an exemplary stacked battery design according to the present technology. Additional configurations other than illustrated, or as variations on the designs, are also encompassed by the present technology. For example, certain embodiments may not include an additional seal material, and first current collector 152 and second current collector 154 may be directly coupled or bonded together. Additionally, the current collectors may include designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1 \times 10^{-4}$ ohm-m in embodiments. Additionally, exemplary current collectors may have an in-plane and through-plane resistivity of between about $1 \times 10^{-3}$ ohm-m and about 1,000 ohm-m. In other embodiments, more conventional electrical distribution may be employed, where current is transferred along conductive current collectors into and out of the cell.

Figure 3:
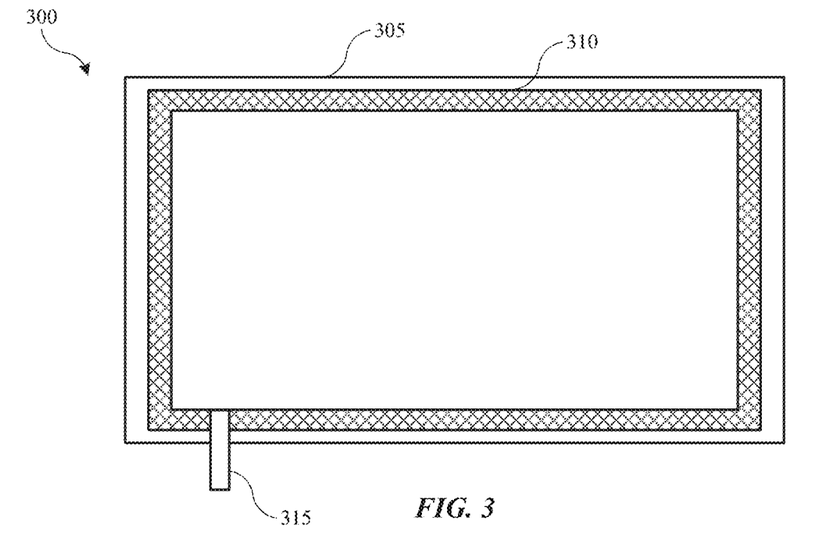
FIG. 3 shows a schematic top view of a battery cell according to some embodiments of the present technology.

Turning to FIG. 3 is shown a schematic top view of a battery cell 300 according to some embodiments of the present technology. Battery cell 300 may be or include any of the components, features, or characteristics of any of the battery cells previously described, and the cell may be included in stacked batteries or energy storage devices as previously discussed. The view illustrated may be of an outer surface of the battery cell and may show an exterior surface of a current collector 305. In embodiments, the current collector may be either of the anode current collector or the cathode current collector. Although battery cells may be characterized by any dimensions according to embodiments of the present technology, in some embodiments the battery cells may be characterized by greater length and width dimensions relative to a thickness of the battery cell. For example, in some embodiments, battery cells may be characterized by a length and/or width of greater than or about 100 mm, and may be characterized by a length and/or width of greater than or about 200 mm, greater than or about 500 mm, greater than or about 1.0 m, greater than or about 1.5 m, greater than or about 2.0 m, greater than or about 3.0 m, or more. Additionally, in some embodiments, battery cells may be characterized by a thickness of less than or about 10 mm, and may be characterized by a thickness of less than or about 5 mm, less than or about 3 mm, less than or about 2 mm, less than or about 1 mm, less than or about 0.5 mm, less than or about 0.25 mm, less than or about 0.1 mm, or less. Accordingly, in some embodiments the length and/or width dimension may be several orders of magnitude greater than the battery cell thickness.

Additionally, current collectors may be or include materials characterized by higher resistivity, which may provide an in-plane resistivity that is many orders of magnitude higher than the through-cell resistivity, and which may be many orders of magnitude higher than conventional current collector materials, such as metals. As explained above, this may allow a z-transmission of current through the constituent battery cells, while limiting or controlling the lateral transmission of current. However, as discussed previously, this may cause challenges for cell balancing operations. When cell balancing circuitry is connected with battery cell 300 at a single location on the current collector, localized current draw may occur at the connection location, while distal regions from the connection position may be reduced much more slowly. This may cause imbalance issues within the cell, where a voltage differential across the cell may develop, which can impact operation and long-term capacity of the cell.

To compensate for this effect, in embodiments of the present technology, each battery cell within a battery may incorporate a conductive band 310 or conductive material extending about a perimeter of the battery cell on a surface of one of the current collectors. Balancing circuitry component 315 may be coupled with the conductive band 310 at a single location, however, this may provide access across the battery. Conductive band 310 may be any metal previously noted, and may be or include any conductive material, which may be characterized by a resistivity of less than $1 \times 10^{-6}$ ohm-m. This lower resistivity may result in a planar conductivity several orders of magnitude higher than the material of the current collector and may be a material characterized by at least about four orders of magnitude lower resistivity, at least about eight orders of magnitude lower resistivity in plane, or more. Accordingly, although the material may be connected with the battery cell at a single location along the conductive band, based on the conductivity differences between the conductive band and the current collector material, current may be effectively drawn from the battery cell uniformly, or substantially uniformly. This may provide cell balancing at the current collectors, despite the high resistivity of current collector materials in some embodiments.

Figure 4:
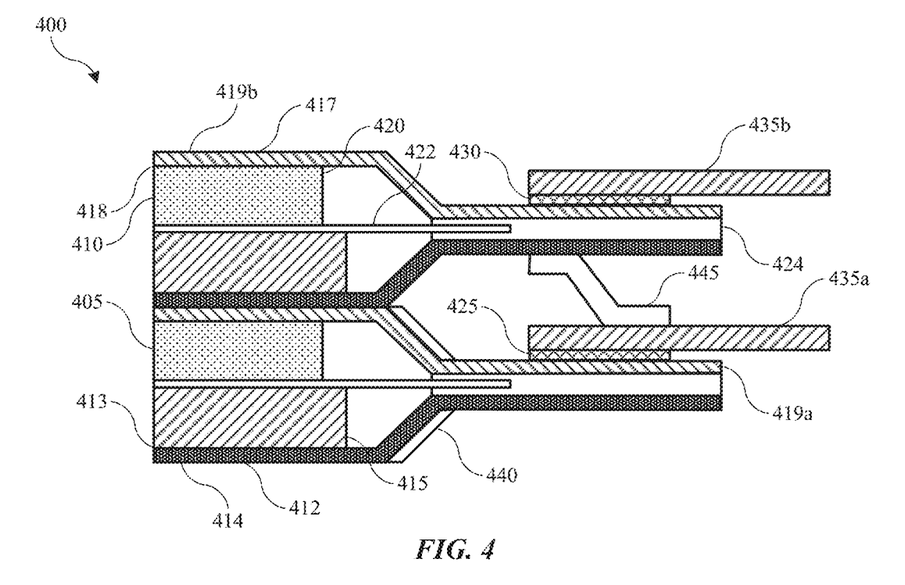
FIG. 4 shows a schematic partial cross-sectional view of components of a battery according to some embodiments of the present technology.

FIG. 4 shows a schematic partial cross-sectional view of components of a battery 400 according to some embodiments of the present technology and may show two battery cells incorporating cell balancing materials. Battery 400, as well as the constituent cells, may include any of the components, materials, and characteristics described elsewhere. It is to be understood that battery 400 is included merely to describe features encompassed by the present technology, and batteries may include tens or hundreds of battery cells as illustrated, and as previously described. The battery cells may be included between conductive plates as discussed above in FIG. 1, which may produce a battery according to some embodiments.

As illustrated, battery 400 may include a first battery cell 405 and a second battery cell 410, although it is to be understood that the battery may include any number of additional cells. As illustrated, second battery cell 410 may be seated on the first battery cell. Each of the first battery cell 405 and the second battery cell 410 may include components as previously described. For example, the battery cells may include an anode current collector 412, which may be characterized by a first surface 413 and a second surface 414 opposite the first surface as illustrated. An anode active material 415 may be disposed on the first surface 413 of the anode current collector 412. The battery cells may include a cathode current collector 417, which may be characterized by a first surface 418 and a second surface 419 opposite the first surface as illustrated. A cathode active material 420 may be disposed on the first surface 418 of the cathode current collector 417. The current collectors and active materials may be any of the materials previously described. Additionally, in some embodiments, one or both of the anode current collector and the cathode current collector may be a polymeric material as previously described, which may include any of the resistivity properties noted above. As illustrated, the anode current collector of second battery cell 410 may be directly coupled with the cathode current collector of first battery cell 405, such as with a conductive adhesive, for example. The battery cells may also include a separator 422 between the anode and cathode active materials and may include a seal 424 between the anode and cathode current collectors at peripheral edges of the cells. Electrolyte may be incorporated within the interior region, and seals 424 may limit leakage or other exposure of the cell materials.

Each battery cell may include a conductive band as discussed above, which may include any of the features or characteristics of conductive band 310 described above. For example, first battery cell 405 may include a first conductive band 425, which may be electrically coupled with the first battery cell and may be electrically coupled between the first battery cell and a battery management system, which may perform cell balancing as previously discussed. Additionally, second battery cell 410 may include a second conductive band 430, which may be electrically coupled with the second battery cell and may be electrically coupled between the second battery cell and the battery management system. The conductive band may be or include a metal foil, or other metal coating applied about the perimeter of the battery cell.

The conductive band may extend continuously about the perimeter to provide a complete conductive path about the battery cell.

As illustrated, the conductive band 425, 430 may be seated on the second surface of a current collector, such as opposite the surface on which the active material is disposed. Although conductive band 425 is illustrated on cathode current collector 419a, and conductive band 430 is illustrated on cathode current collector 419b, it is to be understood that in some embodiments the conductive band may be coupled with the anode current collector, and thus the illustrated configuration is not intended to be limiting, as the conductive band may be seated on either one of the anode current collector or the cathode current collector. The conductive bands may be coupled with the current collector in any number of ways, including with a conductive adhesive, or by a spray coating, or other coating or coupling technique. As illustrated, a flexible extension 435 may be coupled with the conductive band, similar to balancing circuitry 315 discussed above, and which may allow the battery cell to be monitored and balanced by a cell module as part of a battery management system as will be discussed further below. A first flexible extension 435a may be electrically coupled with the first conductive band 425, and a second flexible extension 435b may be electrically coupled with the second conductive band 430.

The conductive bands may be maintained about a periphery of the battery cells in embodiments and may be maintained along a sealed region of the current collectors as illustrated. During operation, battery cells may swell in one or more directions, about an interior region of the cells. However, the exterior regions may remain relatively stable based on the seals. Accordingly, by maintaining the conductive band at a periphery and over the sealed region of the cell, separation of the conductive band from the current collector may be prevented, which may otherwise limit current draw from the location. Additionally, the periphery region of the battery cells may be characterized by a reduced thickness relative to an interior region where the active materials reside and may be characterized by a thickness that is less than or about half the thickness of the interior regions, less than or about one quarter of the thickness of the interior regions, or less. In some embodiments of the present technology, by positioning the conductive band in this region, the conductive band may be accessed within the gap formed between adjacent cells as shown. The conductive band may be less than or about 500 µm in thickness, and may be characterized by a thickness of less than or about 250 µm, less than or about 100 µm, less than or about 50 µm, or less, which may accommodate any of the thicknesses of the battery cells described above, while maintaining a complete conductive band extending about the battery cell. This may allow the balancing components to be incorporated within a cell stack without impacting the overall battery thickness, and in some embodiments, incorporation of the cell balancing components may have no impact on the overall thickness of the battery or incorporated cells.

FIG. 4 may additionally illustrate one or more barrier materials that may be incorporated within the battery cell in some embodiments of the present technology. By utilizing polymeric current collectors in some embodiments of the present technology, a completely hermetic battery cell may not be produced. Accordingly, in some embodiments a metal or otherwise water-impermeable material may be incorporated with the battery cells. In some embodiments, a thin layer of metal may be applied fully across a surface of the current collectors, although this may impact the in-plane resistivity in some embodiments. Additionally, or alternatively, one or more hermetic seals may be incorporated on edge regions of the cells to limit or prevent moisture ingress into the battery cell. For example, a metal tape 440 or adhesive may be applied at edge regions in between sealed edges of the cells and where an adjacent current collector may be coupled. Additionally, a metal tape 445 or adhesive may be applied about the conductive band connecting the band with the overlying cell. For example, the metal tape 445 may be a flexible coupling material, which may be water impermeable. As illustrated, the material may be coupled with the conductive band seated on the cathode current collector and may be coupled with the anode current collector of the overlying battery. It is to be understood that the opposite coupling is similarly encompassed for embodiments where the conductive band is seated on the anode current collector. By utilizing a flexible coupling material that may accommodate deflection, tensile stress on the conductive band may be limited during operation where cell swelling may occur.

Figure 5:
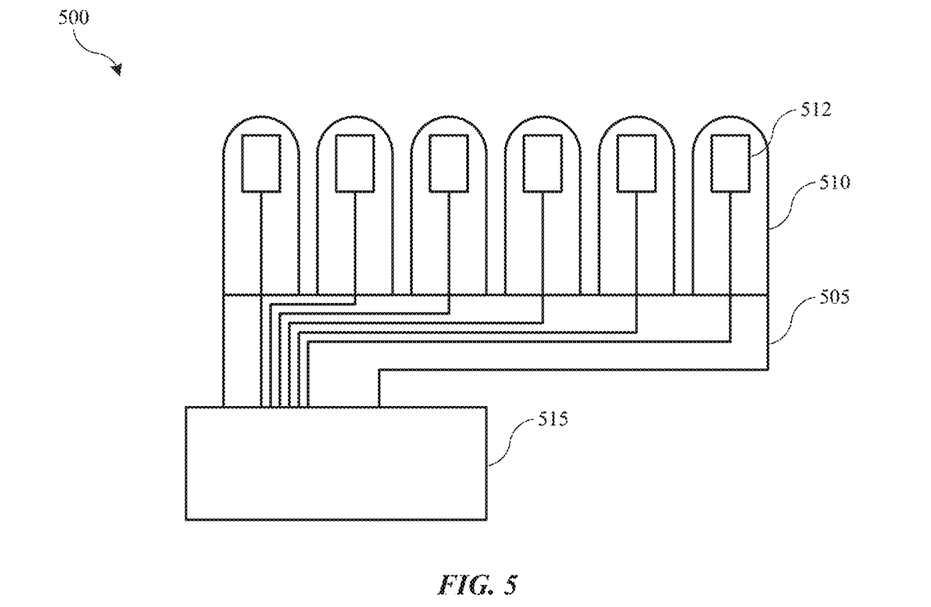
FIG. 5 shows a schematic view of a cell module according to some embodiments of the present technology.

FIG. 5 shows a schematic view of a cell module 500 according to some embodiments of the present technology. Cell module 500 may be incorporated with any of the batteries or battery cells as previously described and may be coupled with the battery cells about the conductive band as discussed above. For example, cell module 500 may include some or all of the balancing circuitry for controlling cell charging and discharging operations and may interface with a battery management system for the battery. Cell module 500 may include a flexible circuit board 505, which may interface with the individual battery cells. For example, flexible circuit board 505 may have one or more flexible extensions 510 as previously described, such as flexible extensions 435 coupling the cell module with individual battery cells on the conductive band as discussed above.

Flexible extensions may allow multiple stacked battery cells to be monitored and/or balanced by one cell module 500, where each flexible extension may be coupled with a separate battery cell. As illustrated, each flexible extension 510 may include a conductive pad 512, which may be coupled with the conductive band of a battery cell. The conductive pad 512 may be adhered, bonded, or otherwise coupled electrically with the conductive band. The conductive pads may be electrically connected with a circuit board 515 within the cell module, which may monitor each individual battery cell. The cell module may monitor any number of characteristics, such as voltage, within an individual battery cell, and may be configured to perform voltage or charge balancing by drawing current from any one or more battery cells through the flexible extensions 510 as will be described below. Although illustrated with six flexible extensions, embodiments of the present technology may include any number of flexible extensions as part of each flexible circuit board 505. For example, flexible circuit boards according to embodiments of the present technology may include greater than or about 2 flexible extensions, and may include greater than or about 5, greater than or about 10, greater than or about 15, greater than or about 20, or more flexible extensions, up to over a hundred or more.

Figure 6:
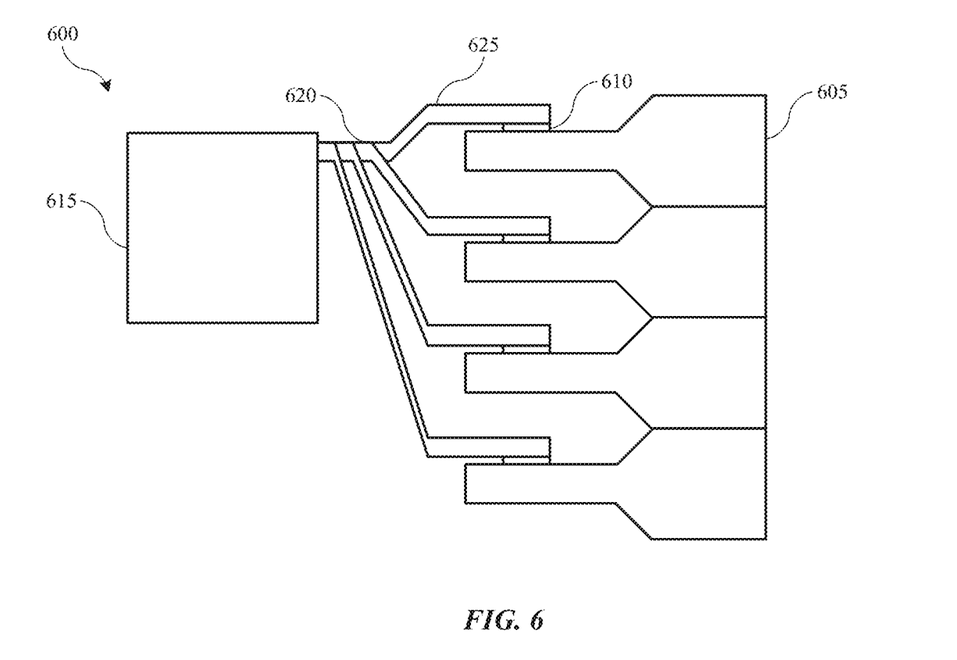
FIG. 6 shows a schematic partial cross-sectional view of a battery according to some embodiments of the present technology.

FIG. 6 shows a schematic partial cross-sectional view of a battery 600 according to some embodiments of the present technology and may illustrate coupling of a cell module with battery cells according to some embodiments of the present technology. It is to be understood that the figure may illustrate any number of features of batteries or components as previously described and may illustrate a simplified view of components previously described. For example, battery 600 may include battery cells 605, which may include any of the components of battery cells as discussed above, although removed from this illustration to focus on coupling of the components. However, any battery or battery cell as discussed above may similarly be incorporated in the configuration illustrated.

As shown, battery 600 may include multiple battery cells seated together, such as to produce a battery as previously described. Each battery cell may include a conductive band 610, which may extend about a periphery of the battery cell as discussed above. The battery may also include a cell module 615 coupled with the battery cells. The cell module 615 may include circuitry configured to monitor voltage or other cell parameters of the cells and may be configured to electrically couple with the cells to draw and/or deliver current to the cells. A flexible circuit board 620 may extend from the cell module and may include a number of flexible extensions 625. Each flexible extension 625 may be electrically coupled with a separate conductive band 610 as illustrated. By having separable flexible extensions from each cell module, the flexible extensions may accommodate the vertical separation of cells, which may allow a cell module to maintain a relative position on the stack.

Figure 7:
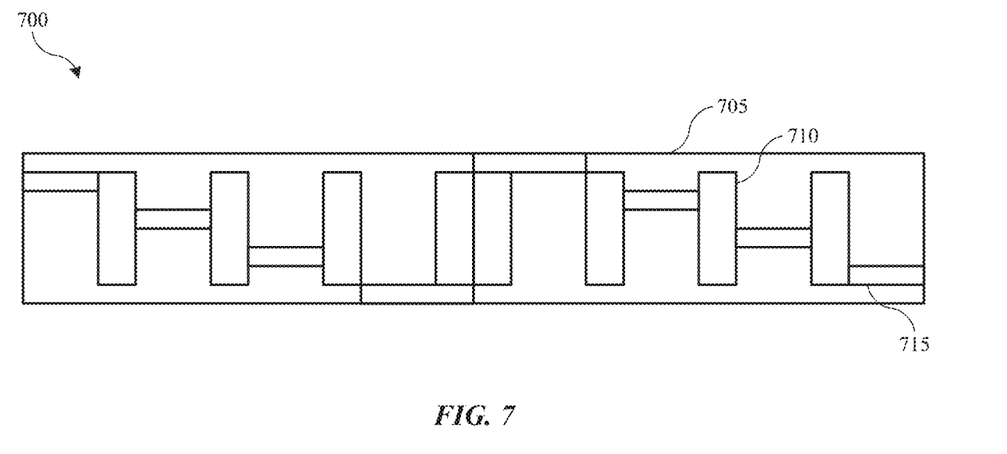
FIG. 7 shows a schematic side view of a battery according to some embodiments of the present technology.

FIG. 7 shows a schematic side view of a battery 700 according to some embodiments of the present technology and may illustrate a configuration of a battery including multiple cells stacked as previously described. It is to be understood that battery 700 may include any component, feature, or characteristic of any battery, battery cell, or structure discussed previously. FIG. 7 may illustrate a battery stack 705, which may be or include any aspect of battery cells described elsewhere, such as the stacked battery 100, or any of the other previously described cell configurations. The figure may also illustrate the incorporation of multiple cell modules 710 coupled with the battery stack 705. The cell modules may include a flexible circuit board 715 extending from the cell module as discussed above, and each flexible circuit board 715 may include a number of flexible extensions as previously described.

Battery stack 705 may include tens or hundreds of battery cells in some embodiments, which may be monitored and balanced by a series of cell modules extending across the battery stack. Although any cell module may include any number of flexible extensions from the associated circuit board, in some embodiments the cell modules may be configured to accommodate less than or about 20% of the total number of battery cells, and may be configured to accommodate less than or about 15%, less than or about 10%, less than or about 5%, or less of the total number of battery cells, which may facilitate integration and stacking. In some embodiments, based on the coupling of the flexible circuit boards within the cell module, the cell modules 710 may extend in line with one another across a side of the battery stack 705. Although the cell modules may all be included on one side of the battery cell stack, it is to be understood that in encompassed embodiments the cell modules may be included in any distribution about any number of sides of the battery stack 705.

As shown, the flexible circuit boards may be coupled with the cell modules to extend from different positions along the cell module, which may allow the cell modules to be maintained in line with one another, while coupling with each battery cell of the stack. This may facilitate electrical connections or other coupling of the system. As illustrated, the cell modules may be connected with the battery stack 705 in groups as illustrated. A first group of the cell modules may extend in a first direction along the side of the cell stack, and then a second group of the cell modules may be rotated to extend in the opposite direction. This may flip the vertical location of the flexible circuit board as illustrated, which may allow the sets to accommodate the entire stack of battery cells. Accordingly, while each cell module may electrically couple with a set of adjacent battery cells, adjacent cell modules may not connect with adjacent sets of battery cells in some embodiments as shown. Instead, each adjacent cell module may couple with sets of battery cells that skip intermediate battery cells, which may be coupled with cell modules from the other group of cell modules. This may provide a more compact configuration, where battery cells may be characterized by minimal thicknesses. This may allow the plurality of cell modules to electrically engage each corresponding battery cell of the plurality of battery cells from the inline cell modules.

Figure 8:
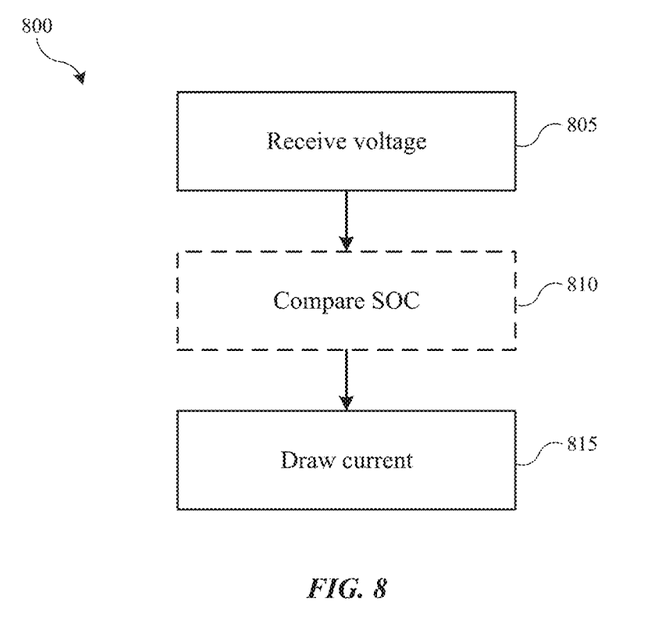
FIG. 8 shows operations from an exemplary method of balancing a battery according to some embodiments of the present technology.

The batteries and systems according to some embodiments of the present technology may be operated to balance battery cells within a battery. FIG. 8 illustrates exemplary operations in a method 800 of balancing a battery, which may include any number of constituent battery cells, according to embodiments of the present technology. The method may encompass any of the batteries, components, or materials as previously described. Method 800 is described in relation to a battery stack, which may include a number of battery cells as previously described, and which may be electrically coupled with one or more cell modules operated to balance the individual cells during charging and/or discharging operations. Each battery cell may include any of the components of configurations previously described, such as including a polymeric current collector, for example. The battery cells may include a conductive band, which may be electrically coupled with a cell module as discussed above.

Method 800 may include receiving a voltage measurement at a cell module at operation 805. The cell module may continuously or intermittently monitor each battery cell, such as during charging, discharging, or static operations, to determine a particular state of charge of the battery cell. Either at the cell module itself, or in conjunction with a battery management system, the cell module may receive voltage measurements from one or more battery cells of the battery. As described above, the cell module may include a number of flexible extensions with each extension electrically coupling with a conductive band of a battery cell. At optional operation 810, the cell monitor may compare the state of charge and/or the voltage measurement with a corresponding measurement of any other cell, as well as with one or more other cell modules coupled with additional battery cells.

The cell module may identify a discrepancy, which may include either a higher or lower reading relative to one or more other cells of the battery. The cell monitor may then draw current from one or more battery cells to bring the cell to a lower state of charge at operation 815. This may be used to balance the cells to a similar state of charge. The balancing may be performed actively or passively in embodiments of the present technology. For example, current may be drawn from one or more battery cells and expended from the system, or current may be drawn from one or more battery cells and provided to one or more other battery cells to actively redistribute charge. During the current draw, current may be drawn from a battery cell with a flexible extension coupled with a conductive band of the battery cell. The current may be drawn or delivered at a rate of greater than or about 25 mA, and may be drawn at a rate of greater than or about 50 mA, greater than or about 100 mA, greater than or about 150 mA, greater than or about 200 mA, greater than or about 250 mA, greater than or about 300 mA, greater than or about 350 mA, greater than or about 400 mA, greater than or about 450 mA, greater than or about 500 mA, or higher.

While higher current draws may create voltage imbalances based on battery cells having higher resistance current collectors as previously explained, the present technology may limit voltage imbalance between the coupling location of the cell monitor and any other location about the cell. For example, in embodiments of the present technology, a voltage differential across any battery cell where current is being drawn or delivered may be less than or about 100 mV, and in some embodiments may be maintained at less than or about 50 mV, less than or about 25 mV, less than or about 20 mV, less than or about 15 mV, less than or about 10 mV, less than or about 5 mV, or less, at any of the current rates noted above. By utilizing conductive bands and cell modules with batteries according to embodiments of the present technology, cell balancing may be more uniformly provided for battery utilizing current collectors characterized by a higher resistance, including with large format battery cells.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, nor both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:
1. A method of balancing a battery comprising:
receiving a voltage measurement at a cell module coupled with a first battery cell of the battery, the first battery cell comprising:
an anode current collector comprising a polymeric material, the anode current collector characterized by a first surface and a second surface opposite the first surface,
an anode active material disposed on the first surface of the anode current collector,
a cathode current collector comprising a polymeric material, the cathode 9 current collector characterized by a first surface and a second surface opposite the first surface,
a cathode active material disposed on the first surface of the cathode current collector,
a first conductive band electrically coupled with the first battery cell, wherein the first conductive band is seated on the second surface of one of the anode current collector or the cathode current collector, and wherein the first conductive band extends about a perimeter of the one of the anode current collector or the cathode current collector; and
drawing a current from the first battery cell of the battery to lower a state of charge of the first battery cell.

2. The method of balancing a battery of claim 1, wherein the anode current collector and the cathode current collector of the first battery cell of the battery are characterized by an electrical resistivity of greater than or about $1 \times 10^{-4}$ ohm-m.

3. The method of balancing a battery of claim 2, wherein, while drawing the current from the first battery cell, a voltage differential across the first battery cell is maintained at less than or about 50 mV at a current draw of greater than or about 50 mA.

4. The method of claim 1, wherein the battery further comprises:
second battery cell seated on the first battery cell, the second battery cell comprising:
an anode current collector comprising a polymeric material, the anode current collector characterized by a first surface and a second surface opposite the first surface,
an anode active material disposed on the first surface of the anode current collector,
a cathode current collector comprising a polymeric material, the cathode current collector characterized by a first surface and a second surface opposite the first surface,
a cathode active material disposed on the first surface of the cathode current collector; and
a second conductive band electrically coupled with the second battery cell, wherein the second conductive band is seated on the second surface of one of the anode current collector or the cathode current collector, wherein the second conductive band extends about a perimeter of the one of the anode current collector or the cathode current collector, and wherein the cell module comprises a second flexible extension electrically coupled with the second conductive band.

5. The method of claim 4, wherein the first conductive band is coupled with the cathode current collector of the first battery cell by a conductive adhesive.

6. The method of claim 5, wherein the battery further comprises a flexible coupling material coupling the first conductive band with the anode current collector of the second battery cell, wherein the flexible coupling material comprises a metal material.

7. The method of claim 6, wherein the first conductive band is maintained within a sealed region extending about a periphery of the first battery cell.

8. The method of claim 7, wherein the flexible coupling material comprises a conductive pad coupled with the first conductive band, and wherein the conductive pad is electrically coupled with the cell module.

9. The method of claim 1, further comprising performing voltage balance by drawing current from the first battery cell at a first flexible extension.

10. A method of balancing a battery comprising:
   receiving a voltage measurement at a cell module coupled with a first battery cell of the battery, the first battery cell comprising:
      a first conductive plate;
      a second conductive plate;
      a plurality of battery cells electrically coupled between the first conductive plate and the second conductive plate, each battery cell of the plurality of battery cells comprising:
         an anode current collector comprising a polymeric material, the anode current collector including a first surface and a second surface opposite the first surface,
         an anode active material disposed on the first surface of the anode current 11 collector,
         a cathode current collector comprising a polymeric material, the cathode current collector including a first surface and a second surface opposite the first surface,
         a cathode active material disposed on the first surface of the cathode current collector, and
         a conductive band seated on the second surface of one of the anode current collector or the cathode current collector, wherein the conductive band extends about a perimeter of the one of the anode current collector or the cathode current collector;
      a cell module including a flexible extension electrically coupled with the conductive band; and
   drawing a current from the first battery cell of the battery to lower a state of charge of the first battery cell.

11. The method of claim 10, wherein the cell module is one of a plurality of cell modules that extend in line with one another across a side of the battery.

12. The method of claim 11, wherein one or more flexible circuit boards extend from a first location along a cell module of the plurality of cell modules, and wherein one or more flexible circuit boards extend from a second location along a cell module of the plurality of cell modules to electrically engage each corresponding battery cell of the plurality of battery cells from inline cell modules.

13. The method of claim 10, wherein the conductive band of each battery cell of the plurality of battery cells is coupled with the cathode current collector of an associated battery cell by a conductive adhesive.

14. The method of claim 13, further comprising:
   a flexible coupling material coupling the conductive band of a battery cell of the plurality of battery cells with the anode current collector of an overlying battery cell, wherein the flexible coupling material comprises a metal material.

15. The method of claim 10, wherein the anode current collector and the cathode current collector of each battery cell of the plurality of battery cells are characterized by an electrical resistivity of greater than or about $1 \times 10^{-4}$ ohm-m.

16. The method of claim 10, wherein the conductive band of each battery cell of the plurality of battery cells is maintained within a sealed region extending about a periphery of the battery cell.

17. The method of claim 10, wherein the flexible extension comprises a conductive pad coupled with an associated conductive band, and wherein the conductive pad is electrically coupled with an associated cell module.

18. The method of claim 10, further comprising identifying a discrepancy of a reading of a battery voltage of a selected battery cell as compared with other battery cells.

19. The method of claim 10, further comprising performing voltage balancing by drawing current from a battery cell coupled with the cell module at the flexible extension.

20. The method of claim 19, wherein the performing voltage balancing includes providing the current to one or more other battery cells to actively redistribute charge.

* * * * *